R. J. PECK.
BRAZING MACHINE.
APPLICATION FILED MAR. 26, 1920.

1,357,080.

Patented Oct. 26, 1920.
2 SHEETS—SHEET 1.

WITNESSES:

INVENTOR
Robert J. Peck
BY
ATTORNEYS

R. J. PECK.
BRAZING MACHINE.
APPLICATION FILED MAR. 26, 1920.
1,357,080.
Patented Oct. 26, 1920.
2 SHEETS—SHEET 2.
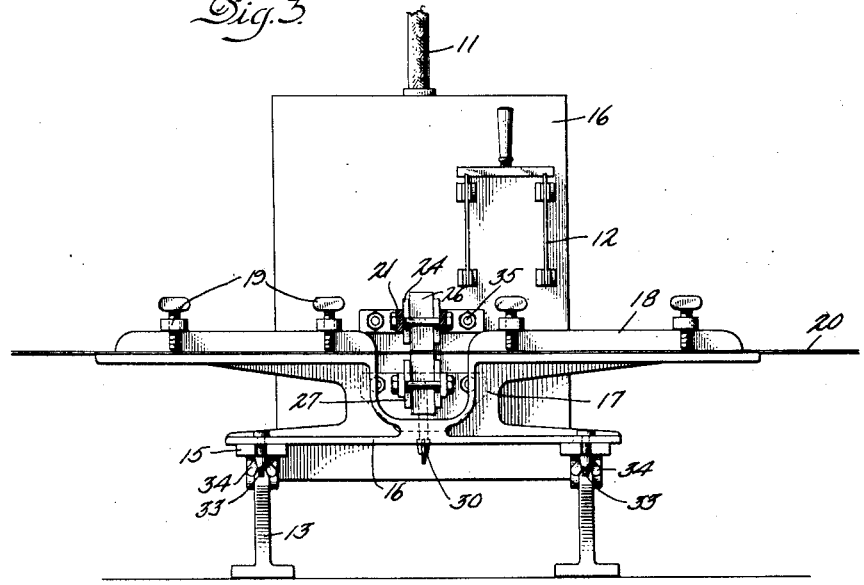
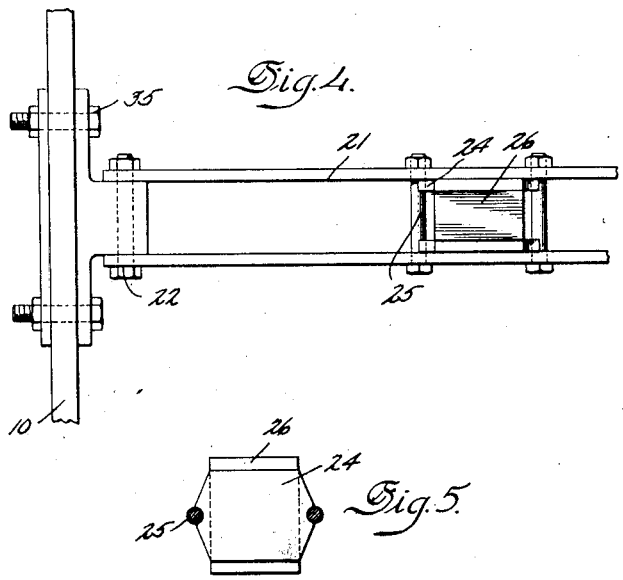
WITNESSES:
INVENTOR
Robert J. Peck
BY
ATTORNEYS

UNITED STATES PATENT OFFICE.

ROBERT JEREMIAH PECK, OF KEY WEST, FLORIDA.

BRAZING-MACHINE.

1,357,080. Specification of Letters Patent. Patented Oct. 26, 1920.

Application filed March 26, 1920. Serial No. 369,054.

*To all whom it may concern:*

Be it known that I, ROBERT J. PECK, a citizen of the United States, and a resident of Key West, in the county of Monroe and State of Florida, have invented a new and Improved Brazing-Machine, of which the following is a full, clear, and exact description.

This invention relates to a brazing machine, and aims more particularly to provide a device of this nature intended to braze the ends of a strip of metal such as a band saw, together.

It is well appreciated that considerable difficulty has been experienced in properly joining the ends of strips of metal together. This has been particularly the case in connection with the securing of the ends of a band saw, so as to form an endless saw. Various expedients have been proposed with a view of properly connecting the ends of a band saw or strips of metal, but these expedients have proven for the most part unsatisfactory, and where devices or metals have been in vogue, for producing a satisfactory joining these devices have proven for the most part non-adaptable to the uses of a small machine, or wood working shop. The reason for this latter defect has been that the apparatus for producing this result would at most be used intermittently, and a large expense would hence not be warranted. On the other hand it is unsatisfactory to have to permit a machine to lie idle until a saw is sent to a shop capable of making the repair required.

With this in view, I have constructed a brazing machine which will be capable of joining together the end of metal strips, and which is particularly applicable to the connection of the ends of a band saw and by means of which an efficient and strong joint will be formed.

A further object of my invention is the construction of a machine of this type which shall be extremely compact and capable of being disassembled so as to occupy a minimum of space when not in use but which may be assembled in a small amount of time.

A further object of my invention is the construction of a brazing machine which shall preferably employ the conventional A. C. 110 V. current in its operation so that the same may be operated wherever any lighting fixture is available.

A still further object of my invention is the making of a brazing machine in which the heat may be absolutely controlled to bring the brazing machine to a step of fusion and in which a variable pressure may be exerted upon the joint to perform the joining operation with that degree of nicety most desirable, and by means of which formation of a scale in the joint or overheating of the same may be avoided.

Reference is had to the attached sheets of drawings which illustrate one practical embodiment of my invention, and in which, Figure 1 is a side view partly in section of a brazing machine constructed in accordance with my invention.

Fig. 3 is a partly sectional front view, and

Figs. 4 and 5 are enlarged views of certain details of the construction applied in connection with certain of the parts.

Figure 1:
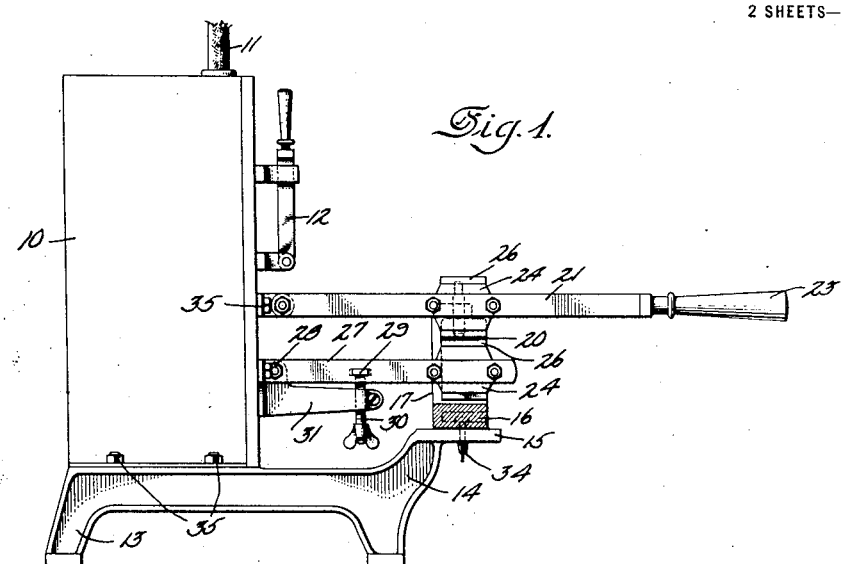

In all of these views like reference numerals designate similar parts, and the reference numeral 10 indicates a casing. Lead wires 11 extend into the casing, and have their opposite ends connected to any suitable source of current supply. The inner ends of the leads are connected to the terminals of the switch 12, the clips of which connect the step-down transformer (not shown) of suitable size.

The casing 10 preferably rests upon a stand 13, the forward end of which is extended as has been indicated by the reference numeral 14 to form supports 15. Conventionally extending between the supports 15, as has been most clearly shown in Fig. 3 is a bracket including a base portion 16, a centrally supporting column 17 and a track 18. The bracket is preferably formed with clamping means such as for instance a series of set screws 19, which set screws are adapted to bear against the upper surface of the track 18 and serve to retain thereon strips of metal or a saw 20.

A lever preferably including a pair of spaced side members 21 has its inner end pivotally secured as at 22 to the front face of the casing 10, a handle such as 23 being secured to the outer end thereof, which handle serves to permit a swinging of the lever from its point of connection to the casing.

A carbon holder including a pair of plates 24 is formed with notched portions in its opposite side edges which notched portions are adapted to be engaged by bolts 25 extending transversely between the side members 21 so that the carbon holder is firmly secured between the side members 21, whereby to move the carbon 26 upon the lever being swung.

A second lever 27 has its outer end pivotally secured as at 28 to the casing 10, such second lever being constructed similarly to the construction of the first named lever, and being further provided with a transversely extending strip 29 between its side members, against which strip the end of a set screw 30 carried by a bracket 31 is adapted to bear, thus permitting of a movement and adjustment of the last named lever.

Mounted adjacent the outer ends of this last named lever is a second carbon holder constructed similarly to the holder shown in Fig. 5, and one of the secondary coil terminals is connected to one of the carbons, the second terminal being attached to the second named carbon, thus providing a completed circuit upon the switch 12 being closed and the carbons being in contact with one another.

Figure 2:
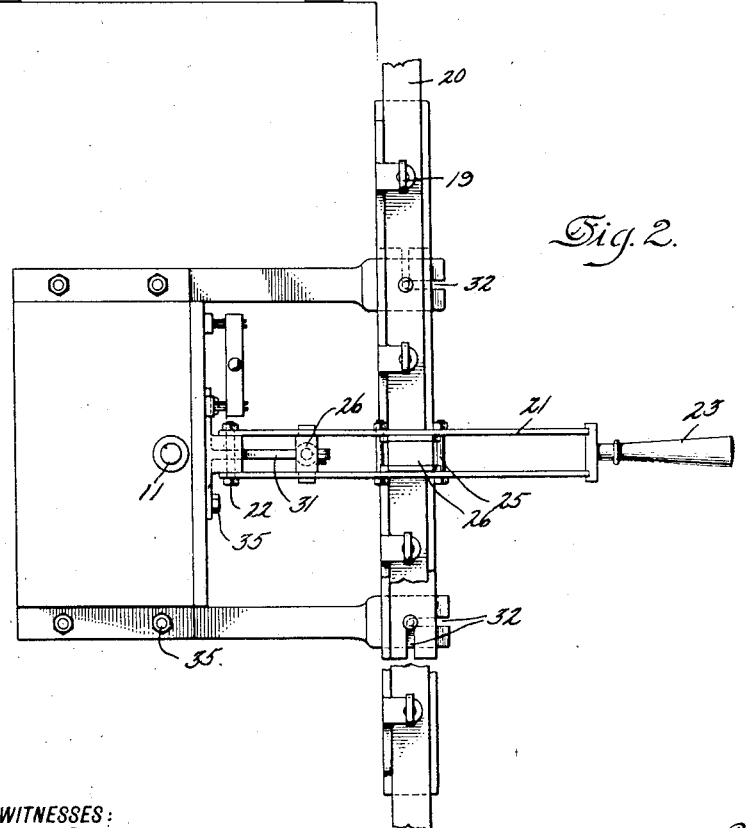
Fig. 2 is a plan view thereof.

Now with a view of permitting an easy disassembling of the entire device it will be noted that the connection between the supports 15 and base portion 16 of the bracket is provided by means of slots 32 within the ends of said portions, and extending transversely to one another, as has been shown in Fig. 2, a set screw such as 33 provided with coöperating winged nuts 34 being provided to prevent any relative movement of these parts.

Further bolts such as 35 are provided, wherever possible to permit of the entire device being disassembled, and stored in a compact bundle in a small space.

It will be seen from the foregoing that the entire device may readily be disassembled and that in operation the lever with which the handle 23 is associated is raised to a vertical position, and the switch 12 opened. The lead wires 11 are now connected to a source of current supply and the strip or saw blade to be brazed is prepared in the usual manner by scarfing the ends and fastening the same within the track 18 by means of the set screws 19, care being taken to place the joint centrally over the lower carbon.

Further adjustment may be had by loosening the thumb screws 33 and moving the bracket bodily. By means of the screw 30, the lever 27 may now be adjusted to properly position the lower carbon under the strip or saw blade 20. A piece of silver solder is now placed between the joint together with a flux and the joint may now be brazed.

To accomplish this the lever with which the handle is associated is brought to a horizontal position, and pressure applied to the same. The switch 12 may now be closed and the pressure continued until the heat generated in the carbon is sufficient to fuse the solder in the joint. As soon as the fusion is completed the switch 12 is opened and the pressure on the lever continued until the temperature reduces to a point where the metal in the joint is solidified. The lever may then be raised to a vertical position and the work removed.

It will be seen that by means of my improved machine that absolute control of heat is had in bringing the brazing metal to a state of fusion. Pressure on the joint forces all surplus metal from between the two surfaces making a perfect and strong joint.

By my construction the process may be closely watched by the operator and the formation of scale in the joint thus avoided. The process is started with cold carbons, and upon closing the switch the temperature commences to rise, and after the lapse of a certain amount of time, the carbons will begin to show red, where they contact with the metal, subsequent to which the brazing metal melts and the switch 12 may be opened. Upon the carbons being cooled to a certain extent, the latter may be raised and it will be found that a perfect joint has been formed.

It will further be appreciated that this device may be used anywhere within reach of an ordinary electric light socket and that the same is extremely economic in operation. Further a saw may be brazed in less time than is required to heat an electric iron. The device is placed at any desirable point and occupies an extremely small amount of space, also the parts are rugged in construction and simple in design so that the machine may be operated by an ordinary skilled workman and may be retailed at an extremely low figure.

Obviously numerous modifications of structure might be resorted to without in the least departing from the scope of my claims, which read—

What I claim as new and desire to secure by Letters Patent is as follows:—

1. A brazing machine, including a stand, a casing removably secured to said stand, carbons also removably secured to said stand and a removable track secured to said stand, said track being adapted to support work adapted to extend between said carbons.

2. A brazing machine, including a stand formed with a supporting surface, a bracket resting upon said supporting surface, said bracket including a base portion formed with slots adapted to extend at right angles to slots formed in said stand supporting portion, means extending through said slots at their point of intersection for holding said bracket in applied position, a track upon said bracket, and means for brazing material positioned upon said track.

3. A brazing machine, including a casing, levers swingingly secured at one of their ends to said casing, carbons secured to said levers, a source of electric current connected to said carbons, and a track extending adjacent the point of contact of said carbons, and being adapted to receive the work to be brazed.

4. A brazing machine, including a casing, levers swingingly secured at one of their ends to said casing, carbons secured to said levers, a source of electric current connected to said carbons, a track extending adjacent the point of contact of said carbons, and being adapted to receive the work to be brazed, and means adapted to secure said work to said track.

5. A brazing machine, including a casing, levers swingingly secured at one of their ends to said casing, carbons secured to said levers, a source of electric current connected to said carbons, a track extending adjacent the point of contact of said carbons and set screws secured to said track and being adapted to bear against the upper surface thereof, and to retain in applied position work mounted upon said track.

6. A brazing machine, including a pair of levers, means for swingingly supporting one of the ends of said levers, said levers including a pair of spaced side members, carbon holders positioned between said side members for supporting the ends of strips to be brazed adjacent the point of contact of said carbon holders, and means for conducting an electric current to said carbon holders.

ROBERT JEREMIAH PECK.